No. 622,679. Patented Apr. 11, 1899.
F. C. HARDING.
GEARING FOR BICYCLES.
(Application filed Oct. 21, 1897.)
(No Model.) 2 Sheets—Sheet 1.
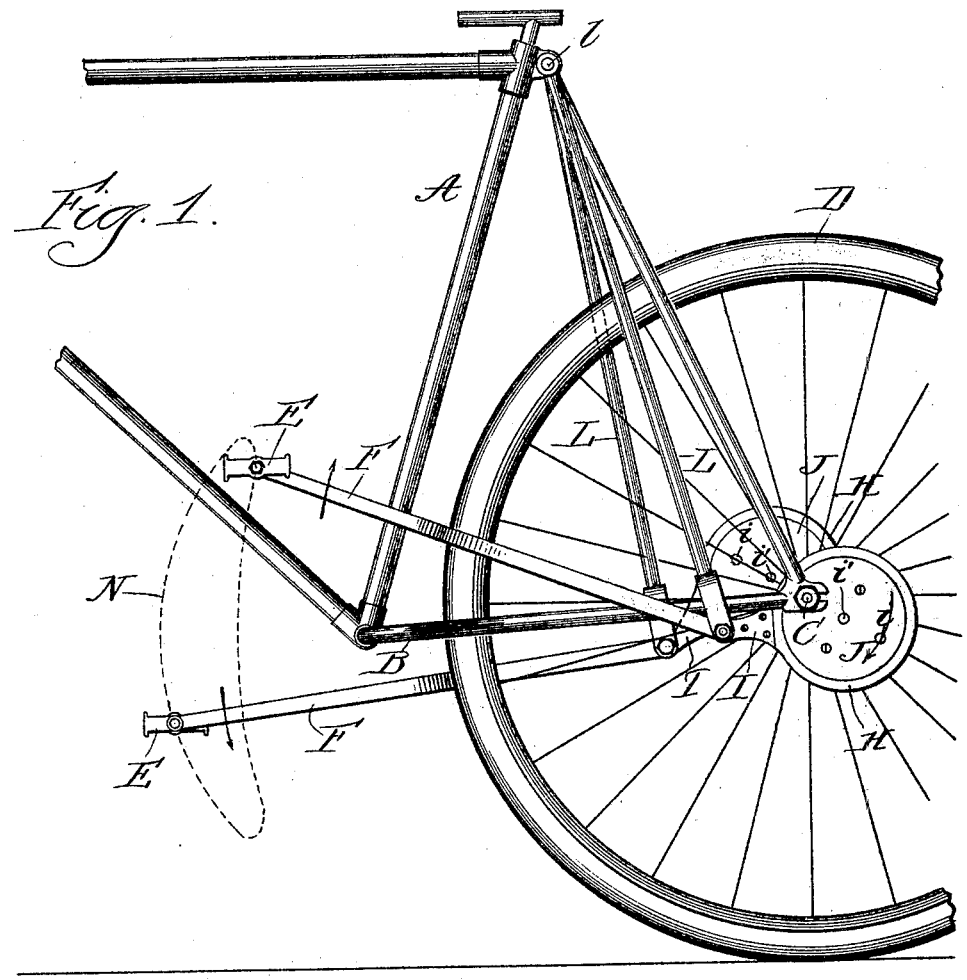
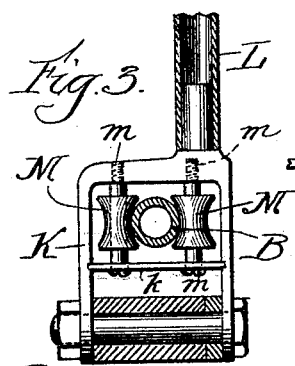
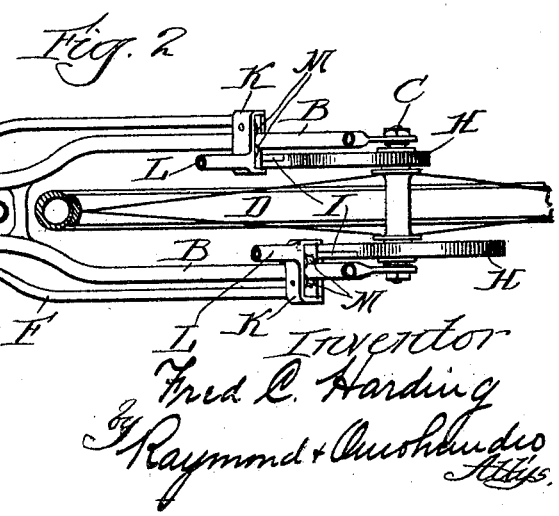
Witnesses
Inventor
Fred C. Harding
by Raymond & Ourohandes
Attys.

No. 622,679. Patented Apr. 11, 1899.
F. C. HARDING.
GEARING FOR BICYCLES.
(Application filed Oct. 21, 1897.)
(No Model.) 2 Sheets—Sheet 2.
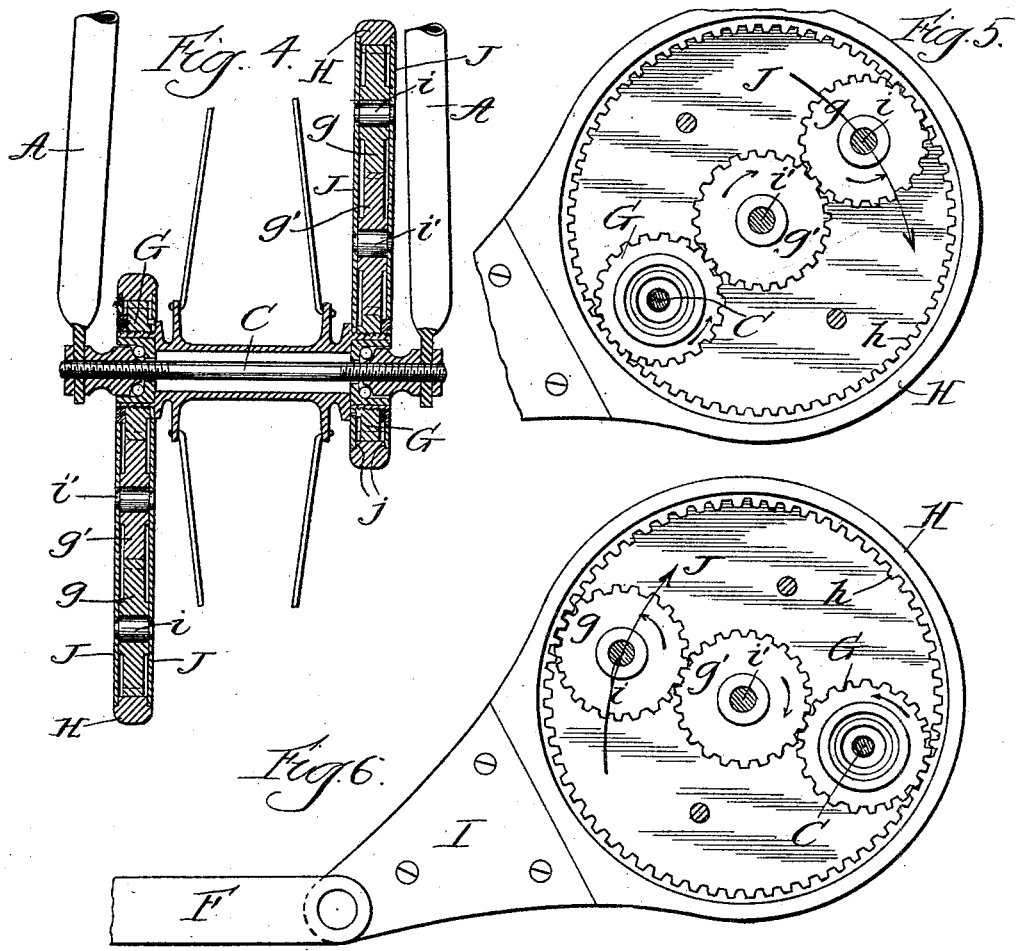
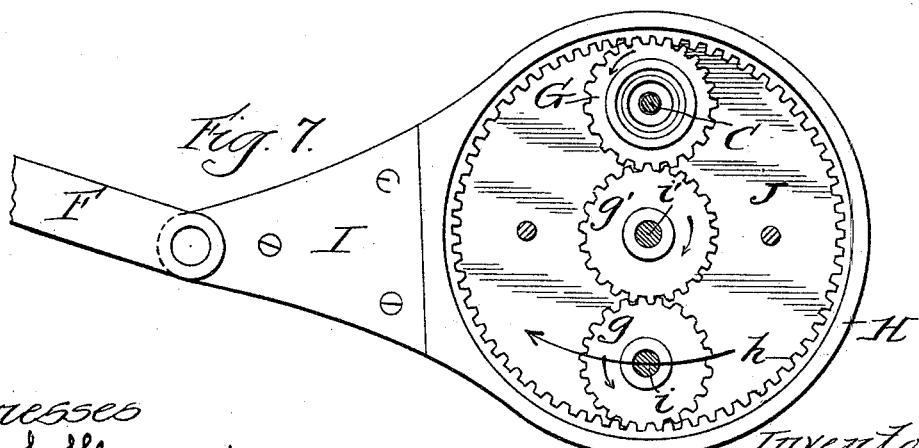
Witnesses
Inventor
Fred C. Harding
by Raymond & Ouohundro
Attys

UNITED STATES PATENT OFFICE.

FRED C. HARDING, OF CHICAGO, ILLINOIS, ASSIGNOR OF ONE-HALF TO RICHARD C. DANIEL, OF SAME PLACE, AND RICHARD B. DANIEL, OF SANBORN, IOWA.

GEARING FOR BICYCLES.

SPECIFICATION forming part of Letters Patent No. 622,679, dated April 11, 1899.

Application filed October 21, 1897. Serial No. 655,896. (No model.)

*To all whom it may concern:*

Be it known that I, FRED C. HARDING, a citizen of the United States, residing at Chicago, in the county of Cook and State of Illinois, have invented certain new and useful Improvements in Chainless Gearing for Bicycles, of which the following is a full, clear, and exact description, reference being had to the accompanying drawings, forming a part of this specification.

My invention relates to certain new and useful improvements in driving mechanism for bicycles and other vehicles of a similar character, although the invention may be employed with equally good results in many other relations to which it is adapted.

The primary object of the present invention is to dispense with the usual driving-chain and sprocket-wheels employed for communicating movement to the carrying-wheels of a vehicle of this description and substitute therefor a direct gearing which does not employ a chain and its customary associated elements.

Another object of this invention is to provide such a construction and arrangement of parts that in practical operation the feet of the rider will travel in an orbit substantially the same as their orbit of movement in walking, thereby relieving the rider of exhaustive and disagreeable strain and exertion due to an unusual movement of his feet.

Another object of the invention is to increase the forward movement of the vehicle by means of a peculiar arrangement and construction of parts for multiplying the power without any unusual or additional increase in the motive power applied and without any additional strain on the rider.

Another object of the invention is to control the orbit of movement of the pedals by means of pendulums which positively direct the movement of the pedal-levers.

Further objects of the invention are to keep the gear-wheel on the rear axle in positive engagement at all times with the internal gear on the eccentric box, to protect the gearing from foreign matter and from injury by external means, to impart a proper movement to the eccentric box and thereby drive the rear axle and rear wheel in the desired direction, to provide a movable pivot and fulcrum for the pedal-levers, and to guide the rear end of the pedal-levers in the proper direction to impart the desired movement to the pedals and to the eccentric box.

My invention also has other objects in view, which will be pointed out hereinafter in connection with the detail description and the accompanying drawings, referring to which—

Figure 1 is a side elevation of a portion of a bicycle, showing my invention applied thereto; but it will be distinctly understood that I do not thereby confine myself to the application of my invention to a bicycle, as it may be adapted to a great variety of vehicles with the exercise of simple mechanical skill, the embodiment with a bicycle being shown simply for the purpose of convenience. Fig. 2 is a top plan view of the mechanism shown in Fig. 1, partly in section. Fig. 3 is a detailed sectional view of the lower end of the pendulum, showing the fulcrum of the pedal-lever and its location. Fig. 4 is a central sectional view of the rear axle and the parts carried thereby. Figs. 5, 6, and 7 are devices showing the different positions of the eccentric box, the gears within the same, and the position thereof with relation to the rear axle.

Referring to the drawings, in which like letters of reference denote corresponding parts in all the figures, A designates the frame of an ordinary bicycle; B, the rear fork of the frame; C, the rear axle; D, the rear carrying-wheel; E, the pedals, and F the pedal-levers. These parts are arranged with substantially the same relation to each other as is customary in bicycles of this type at the present time, the essential features of the invention consisting in the parts and devices hereinafter described and in the peculiar movements imparted to said devices and to the pedals and pedal-levers. The axle C carries two pinions or toothed gears G, which are arranged just within the frame and adjacent thereto, as shown in Fig. 4, and as the devices associated with these pinions are the same, being duplicated on each side of the machine, I will now proceed to describe those on one side only.

An eccentric box H is provided with an internal gear *h* and a forwardly-projecting arm I. This box is arranged on the rear axle, and the driving-pinion G of the rear wheel of the vehicle is held in engagement with the internal gear h by means of an idle pinion g, which also meshes with the internal gear, and the intermediate idle pinion g', which meshes with the pinions G and g. These idle pinions are preferably mounted on the short shafts i, which are journaled in bearings in the side plates J. These side plates are held in place by means of the shafts i against the shoulders j on the eccentric box adjacent to the internal gear thereon, and they revolve with the idle pinions around the rear axle, as indicated in the drawings and hereinafter more fully pointed out.

The forward end of the arm I of the eccentric box is rigidly connected to the pedal-lever and is fulcrumed in the lower end of a yoke K on the lower end of the pendulum-lever L, which is pivotally secured to the upper portion of the frame of the vehicle adjacent to the seat-post at l. This yoke K embraces one member of the rear fork, and to facilitate its operation and sliding on said member two rollers M are arranged on vertical pins m, which are secured in the upper portion of the yoke and to a plate k. These guide-rollers are loosely arranged on the pins, and they are capable of a limited vertical movement to enable the pendulum-lever to swing the proper distance and in its proper orbit, still being guided on the member of the rear fork. The arm I constitutes the rear end of the pedal-lever, which is provided with a shifting fulcrum and whose movement is controlled by the pendulum-lever.

This being the general construction of my invention, I will now describe the operation of the different parts and the apparatus as a whole.

Referring to Fig. 1, it will be observed that one pedal has almost reached the lowest limit of its movement, while the other pedal is nearer finishing its forward movement, and if we assume the uppermost pedal has completed its upward movement and is about to be forced down it will be observed that the downward movement of said pedal will travel in an orbit indicated by the dotted lines N, the pedal having its greatest sweep or length of movement when moving downward—that is to say, the pedal will actually travel farther on its downward movement than on its upward movement. The pedal-lever is fulcrumed in the lower end of the pendulum-lever, so that when the pedal moves down the eccentric box will be pulled forward, the lateral movement of the eccentric box being substantially indicated by the dotted lines showing the path of movement of the pedal, and it will be observed that the position of the eccentric box in its lateral movement will correspond substantially to the position of the pedal at right angles to the vertical plane of the frame. The forward movement of the eccentric box causes the driving-pinion G to revolve on its axis to the left, as indicated by the arrow, and the idle pinions hold the driving-pinion G in contact with the internal gear of the eccentric box at all times. By reason of the movement communicated to the pinions by the internal gear the idle gears will travel around the driving-gear as a center and within the eccentric box, several positions of the eccentric box and the pinions being illustrated in Figs. 5, 6, and 7.

The movement of the eccentric box, as well as the movement of the pedal, is controlled by the pendulum-lever, which gives to the pedal-lever a shifting fulcrum. The pendulum travels in an orbit, and the guide-rollers adjust themselves on their pinions so that the pendulum-lever will be guided on the rear fork and still permitted to move easily and describe its proper orbit; but this movement of the pendulum-lever provides a regular shifting fulcrum for the pedal-lever, whereby the pedal is enabled to described the peculiar orbit indicated by the dotted lines N, so as to impart the desired movement to the driving-pinion G and the rear axle.

An apparatus constructed in accordance with my invention provides a chainless gearing mechanism for bicycles of simple construction, the parts being located, arranged, and protected in such a manner that they will not easily get out of order, and at the same time they are readily accessible for the purposes of examination and repair. By reason of the peculiar movement which the pedals describe I am able to secure a greater propelling force with less propelling power necessary to generate the same, as the downward movement of the pedal, during which the power is applied, is long in comparison to the upward movement.

I am aware that changes in the form and proportion of parts and details of construction of my invention may be made without departing from the spirit or sacrificing the advantanges thereof, and I therefore reserve the right to make all such changes as fall within the spirit and scope of the invention.

Having thus fully described my invention, what I claim, and desire to secure by Letters Patent, is—

1. The combination with the rear axle of a vehicle, of driving-pinions secured on said axle, boxes eccentrically mounted on said axle and provided with internal gears adapted to be held in engagement with said pinions to communicate a proper rotary movement to the axle, side plates for said boxes revolubly connected therewith, pedal-levers connected to the front of said eccentric boxes, pendulum-levers pivotally connected at their upper ends to the frame of the vehicle and at their lower ends to the pedal-levers and the eccentric boxes at their jointure to govern the movement of the pedal-levers and the eccentric boxes, and devices for guiding the pendulum-levers on the frame of the vehicle, substantially as described.

2. The combination with the rear axle of a vehicle, of driving-pinions secured on said axle, eccentric boxes provided with an internal gear, a pair of traveling idle pinions arranged in alinement with each driving-pinion and adapted to hold said driving-pinions in constant contact with the internal gear and travel around the driving-pinions, loosely-secured revoluble side plates for said boxes, pendulum-levers pivoted at their upper ends to the frame of the vehicle and pedal-levers fulcrumed in the lower ends of the pendulum-levers and connected at their rear ends to the periphery of the eccentric boxes, and devices for guiding the pendulum-levers on the frame of the machine, substantially as and for the purpose described.

3. The combination with the axle of a vehicle, of boxes mounted eccentrically thereon and provided with gearing adapted to communicate a proper rotary movement to said axle, side plates for said boxes revolubly secured thereto, pedal-levers rigidly connected to said boxes, and pendulum-levers pivotally connected at their upper ends to the frame of the vehicle and having their lower ends guided on said frame, said pedal-levers being fulcrumed in the lower end of the pendulum-levers, substantially as described.

4. The combination with the rear axle of a vehicle, of a pendulum-lever pivoted to the frame of the vehicle, a pedal-lever fulcrumed in the lower end of said pendulum-lever and provided at its rear end with an internal gear, a driving-pinion rigidly secured on the rear axle and maintained in constant contact with said internal gear, and devices for guiding the pendulum-lever on the frame of the vehicle, substantially as described.

5. The combination with the rear axle of a vehicle, and a pedal-lever adapted to impart a rotary movement thereto, of a pendulum-lever pivotally secured at its lower end to the pedal-lever, and guide-rollers carried by said pendulum-lever to engage the frame of the vehicle to guide the pendulum on the frame, substantially as described.

6. The combination with the rear axle of a vehicle, and a pedal-lever adapted to impart a rotary movement thereto, of a pendulum-lever pivotally connected to the pedal-lever and forming a shifting fulcrum therefor, and vertically-adjustable guide-rollers carried by said pendulum-lever to guide said lever on the frame of the vehicle, substantially as described.

FRED C. HARDING.

Witnesses:
WM. O. BELT,
R. C. DANIEL.